United States Patent
Gresset et al.

(10) Patent No.: US 8,325,651 B2
(45) Date of Patent: Dec. 4, 2012

(54) METHOD AND A DEVICE FOR RELAYING SYMBOLS TRANSFERRED BY A SOURCE TO A DESTINATION

(75) Inventors: Nicolas Gresset, Rennes Cedex (FR); Melanie Plainchault, Rennes Cedex (FR); Ghaya Rekaya-Ben Othman, Rennes Cedex (FR)

(73) Assignee: Mitsubishi Electric Corporation, Tokyo (JP)

( * ) Notice: Subject to any disclaimer, the term of this patent is extended or adjusted under 35 U.S.C. 154(b) by 298 days.

(21) Appl. No.: 12/850,976

(22) Filed: Aug. 5, 2010

(65) Prior Publication Data
US 2011/0051704 A1    Mar. 3, 2011

(30) Foreign Application Priority Data
Sep. 3, 2009   (EP) .................................. 09169408

(51) Int. Cl.
*H04Q 7/00*   (2006.01)
*H04Q 7/24*   (2006.01)
(52) U.S. Cl. ........................................ 370/328; 370/338
(58) Field of Classification Search .................. 370/252, 370/254, 255, 328, 338, 401
See application file for complete search history.

(56) References Cited

U.S. PATENT DOCUMENTS

| | | | |
|---|---|---|---|
| 2008/0219229 A1* | 9/2008 | Zheng | 370/338 |
| 2009/0017753 A1* | 1/2009 | Kim et al. | 455/10 |
| 2009/0175214 A1 | 7/2009 | Sfar et al. | |
| 2009/0201900 A1* | 8/2009 | Suga | 370/338 |
| 2010/0080139 A1* | 4/2010 | Palanki et al. | 370/252 |

OTHER PUBLICATIONS

U.S. Appl. No. 12/856,109, filed Aug. 13, 2010, Gresset, et al.
Reza Hoshyar, et al., "Performance evaluation of HARQ schemes for Cooperative Regenerative Relaying", Communications, 2009, ICC '09, IEEE International Conference on, IEEE, Jun. 2009, XP031506295, 6 pages.
Amandeep Singh Sappal, et al., "Digital Pre-distortion of Power Amplifiers using look-Up Table Method with Memory Effects", ICGST-PDCS, vol. 8, Issue 1, Dec. 2008, XP-002570028, pp. 39-44.
Ravi Narasimhan, "Throughput-Delay Performance of Half-Duplex Hybrid-ARQ Relay Channels", Communications, 2008, ICC '08, IEEE International Conference on, IEEE, May 2008, XP31265514, pp. 986-990.
Ghassan M. Kraidy, et al., "Coding for the Non-Orthogonal Amplify-and-Forward Cooperative Channel", Information Theory Workshop, 2007, ITW '07, IEEE, Sep. 2007, XP031136668, pp. 626-631.

* cited by examiner

*Primary Examiner* — Hong Cho
(74) *Attorney, Agent, or Firm* — Oblon, Spivak, McClelland, Maier & Neustadt, L.L.P.

(57) ABSTRACT

The present invention concerns a method for relaying symbols transferred by a source to a destination in a wireless cellular telecommunication network, the symbols being relayed by a relay, the relay receiving symbols. The relay:
  receives symbols,
  successfully decodes the symbols,
  generates symbols that have been previously transferred by the source,
  generates symbols that have not previously been transferred by the source,
  combines the generated symbols into combined symbols,
  transfers the combined symbols to the destination.

14 Claims, 5 Drawing Sheets

METHOD AND A DEVICE FOR RELAYING SYMBOLS TRANSFERRED BY A SOURCE TO A DESTINATION

The present invention relates generally to a method and a device for relaying symbols transferred by a source to a destination in a wireless cellular telecommunication network.

Future wireless cellular telecommunication network will use higher frequency bands than the ones used by current wireless cellular telecommunication networks.

New wireless cellular telecommunication networks, particularly in urban environment, will have dead zones, wherein the signals transferred between base stations and terminals will be highly attenuated.

The present invention aims at enhancing the signals received by the destination by using a relay.

Furthermore, the present invention aims at increasing the diversity of symbols transferred to the destination.

To that end, the present invention concerns a method for relaying symbols transferred by a source to a destination in a wireless cellular telecommunication network, the symbols being relayed by a relay, the relay receiving symbols, characterised in that the method comprises the steps executed by the relay of:
  receiving symbols,
  successfully decoding the symbols,
  generating symbols that have been previously transferred by the source,
  generating symbols that have not previously been transferred by the source,
  combining the generated symbols into combined symbols,
  transferring the combined symbols to the destination.

The present invention concerns also a device for relaying symbols transferred by a source to a destination in a wireless cellular telecommunication network, the symbols being relayed by a relay, the relay receiving symbols, characterised in that the device is included in the relay and comprises:
  means for receiving symbols,
  means for decoding the symbols,
  means for generating symbols that have been previously transferred by the source,
  means for generating symbols that have not previously been transferred by the source,
  means for combining the generated symbols into combined symbols,
  means for transferring the combined symbols to the destination.

Thus, the signals received by the destination are enhanced.

Furthermore, by smartly mixing symbols that have been previously transferred by the source and symbols that have not previously been transferred by the source, the present invention can build a full diversity scheme and thus change the diversity order of a subset of symbols previously transferred by the source.

According to a particular feature, the combined symbols are transferred at the same time the source transfers symbols that have not previously been transferred by the source.

Thus, the spectral efficiency of the system is not degraded.

According to a particular feature, acknowledgment or non acknowledgment message transferred by the destination to the source is detected and the generation of symbols, the combination of symbols and the transfer of the combined symbols are executed if acknowledgment message is not detected.

Thus, the relay only transmits in cases where it can help the destination, which limits the interference of the relay on other neighbouring wireless communications.

According to a particular feature, the signals transferred by the relay during two time periods are defined as $[f_1(z_1, z_2, z_3, z_4)\ f_2(z_1, z_2, z_3, z_4)]$, where $z_1$ and $z_2$ are the generated symbols that have been previously transferred by the source, $z_3$ and $z_4$ are the generated symbols that have not previously been previously transferred by the source, $f_1$ and $f_2$ are functions used for combining the generated symbols.

According to a particular feature, $f_1$, and $f_2$ are chosen as:

$$\begin{cases} f_1(z_1, z_2, z_3, z_4) = -\frac{1}{\alpha}(z_2 + \alpha z_4)^* \\ f_2(z_1, z_2, z_3, z_4) = \frac{1}{\alpha}(z_1 + \alpha z_3)^* \end{cases}$$

where * denotes the complex conjugate, $\alpha$ is a scaling factor equal to $\alpha=\frac{1}{2}$.

According to a particular feature, $f_1$, and $f_2$ are chosen as:

$$\begin{cases} f_1(z_1, z_2, z_3, z_4) = j\frac{\overline{\phi}}{\alpha\phi}(z_2 + \overline{\alpha}z_4) \\ f_2(z_1, z_2, z_3, z_4) = \frac{\overline{\phi}}{\alpha\phi}(z_1 + \overline{\alpha}z_3) \end{cases}$$

where $\phi$ is complex constant and $\overline{x}$ is the algebraic conjugate of x, $$\alpha = \frac{1+\sqrt{5}}{2} \text{ and } \overline{\alpha} = \frac{1-\sqrt{5}}{2},$$

$\overline{\phi}=1+j\alpha$ and $\phi=1+j-j\alpha$.

According to a particular feature, $f_1$, and $f_2$ are chosen as:

$$\begin{cases} f_1(z_1, z_2, z_3, z_4) = -\frac{1-2j}{\sqrt{7}}z_1^* - \frac{1+j}{\sqrt{7}}z_2^* - z_4^* \\ f_2(z_1, z_2, z_3, z_4) = -\frac{1-j}{\sqrt{7}}z_1^* + \frac{1+2j}{\sqrt{7}}z_2^* + z_3^*. \end{cases}$$

The present invention concerns also a method for decoding symbols received by a destination in a wireless cellular telecommunication network, the symbols being relayed by a relay, characterised in that the method comprises the steps executed by the destination of:
  receiving signals representative of symbols,
  reading symbols previously received by the destination and memorised by the destination,
  combining the received symbols and the read symbols,
  decoding the combined symbols considering that the relay transferred symbols formed by a combination of symbols that have been previously transferred by the source and symbols that have not previously been transferred by the source.

The present invention concerns also a device for decoding symbols received by a destination in a wireless cellular telecommunication network, the symbols being relayed by a relay, characterised in that the device is included in the destination and comprises:
  means for receiving signals representative of symbols,
  means for reading symbols previously received by the destination and memorised by the destination, means for combining the received symbols and the read symbols, means for decoding the combined symbols considering that the relay transferred symbols formed by a combination of symbols that have been previously transferred by the source and symbols that have not previously been transferred by the source.

Thus, the signals received by the destination are enhanced.

Furthermore, by receiving mixed symbols that have been previously transferred by the source and symbols that have not previously been transferred by the source, the present invention can build a full diversity scheme and thus change the diversity order of a subset of symbols previously transferred by the source.

According to a particular feature, the signals representative of symbols are defined as:

$$Y_2 = [h_{SD} \ h_{RD}]\begin{bmatrix} z_3 & z_4 \\ f_1(z_1, z_2, z_3, z_4) & f_2(z_1, z_2, z_3, z_4) \end{bmatrix} + N_2$$

where $N_2$ is a Nrx2 matrix of additive white Gaussian noise, $h_{SD}$ is the vector of Nr propagation coefficients of the channel between the source and the destination, Nr is the number of antennas of the destination, $h_{RD}$ is the vector of Nr propagation coefficients of the channel between the relay and the destination, $z_1$ and $z_2$ are the symbols previously received by the destination and memorised by the destination, $z_1$ and $z_2$, $z_3$ and $z_4$ are the symbols of which the received signals are representative $f_1$ and $f_2$ are functions used for combining the received symbols and the read symbols and the received symbols are combined according to the following formula:

$$Y = \frac{Y_1 + \alpha Y_2}{\sqrt{1+|\alpha|^2}} =$$

$$\frac{1}{\sqrt{1+|\alpha|^2}}[h_{SD} \ h_{RD}]\begin{bmatrix} z_1 + \alpha z_3 & z_2 + \alpha z_4 \\ \alpha f_1(z_1, z_2, z_3, z_4) & \alpha f_2(z_1, z_2, z_3, z_4) \end{bmatrix} + N$$

where N is a matrix of additive white Gaussian noise and Y1 which is representative of symbols previously received by the destination and memorised by the destination is $$Y_1 = [h_{SD} \ h_{RD}]\begin{bmatrix} z_1 & z_2 \\ 0 & 0 \end{bmatrix} + N_1$$

where $N_1$ is a Nrx2 matrix of additive white Gaussian noise.

According to a particular feature, $f_1$ and $f_2$ are chosen as:

$$\begin{cases} f_1(z_1, z_2, z_3, z_4) = -\frac{1}{\alpha}(z_2 + \alpha z_4)^* \\ f_2(z_1, z_2, z_3, z_4) = \frac{1}{\alpha}(z_1 + \alpha z_3)^* \end{cases}$$

where * denotes the complex conjugate, $\alpha$ is a scaling factor equal to $\alpha=\frac{1}{2}$ and the read symbols and the received symbols are combined according to the following formula:

$$Y = \frac{Y_1 + \alpha Y_2}{\sqrt{1+|\alpha|^2}} =$$

$$\frac{1}{\sqrt{1+|\alpha|^2}}[h_{SD} \ h_{RD}]\begin{bmatrix} z_1 + \alpha z_3 & z_2 + \alpha z_4 \\ \alpha f_1(z_1, z_2, z_3, z_4) & \alpha f_2(z_1, z_2, z_3, z_4) \end{bmatrix} + N$$

According to a particular feature, $f_1$ and $f_2$ are chosen as:

$$\begin{cases} f_1(z_1, z_2, z_3, z_4) = j\frac{\overline{\phi}}{\alpha \phi}(z_2 + \overline{\alpha} z_4) \\ f_2(z_1, z_2, z_3, z_4) = \frac{\overline{\phi}}{\alpha \phi}(z_1 + \overline{\alpha} z_3) \end{cases}$$

where $\phi$ is complex constant and $\overline{x}$ is the algebraic conjugate of x, $$\alpha = \frac{1+\sqrt{5}}{2}, \overline{\alpha} = \frac{1-\sqrt{5}}{2},$$

$\overline{\phi}=1+j\alpha$ and $\phi=1+j-j\alpha$, and the read symbols and the received symbols are combined according to the following formula:

$$Y = \frac{\phi(Y_1 + \alpha Y_2)}{\sqrt{1+|\alpha|^2}} =$$

$$\frac{1}{\sqrt{1+|\alpha|^2}}[h_{SD} \ h_{RD}]\begin{bmatrix} \phi(z_1 + \alpha z_3) & \phi(z_2 + \alpha z_4) \\ \alpha\phi f_1(z_1, z_2, z_3, z_4) & \alpha\phi f_2(z_1, z_2, z_3, z_4) \end{bmatrix} + N.$$

According to a particular feature, $f_1$ and $f_2$ are chosen as:

$$\begin{cases} f_1(z_1, z_2, z_3, z_4) = -\frac{1-2j}{\sqrt{7}}z_1^* - \frac{1+j}{\sqrt{7}}z_2^* - z_4^* \\ f_2(z_1, z_2, z_3, z_4) = -\frac{1-j}{\sqrt{7}}z_1^* - \frac{1+2j}{\sqrt{7}}z_2^* + z_3^* \end{cases}$$

and the read symbols and the received symbols are combined according to the following formula:

$$\frac{1}{\sqrt{7}}Y_1\begin{bmatrix} 1+j & -(1+2j) \\ -1+2j & -(1-j) \end{bmatrix} + Y_2 = [h_{SD} \ h_{RD}]$$

$$\begin{bmatrix} \frac{(1+j)z_1}{\sqrt{7}} + \frac{(-1+2j)z_2}{\sqrt{7}} + z_3 & -\frac{(1+2j)z_1}{\sqrt{7}} - \frac{-(1-j)z_2}{\sqrt{7}} + z_4 \\ -\frac{(1-2j)z_1^*}{\sqrt{7}} - \frac{(1+j)z_2^*}{\sqrt{7}} - z_4^* & -\frac{(1-j)z_1^*}{\sqrt{7}} + \frac{(1+2j)z_2^*}{\sqrt{7}} + z_3^* \end{bmatrix} + N.$$

According to still another aspect, the present invention concerns computer programs which can be directly loadable into a programmable device, comprising instructions or portions of code for implementing the steps of the methods according to the invention, when said computer programs are executed on a programmable device.

Since the features and advantages relating to the computer programs are the same as those set out above related to the methods and devices according to the invention, they will not be repeated here.

The characteristics of the invention will emerge more clearly from a reading of the following description of an example embodiment, the said description being produced with reference to the accompanying drawings, among which:

Figure 3:
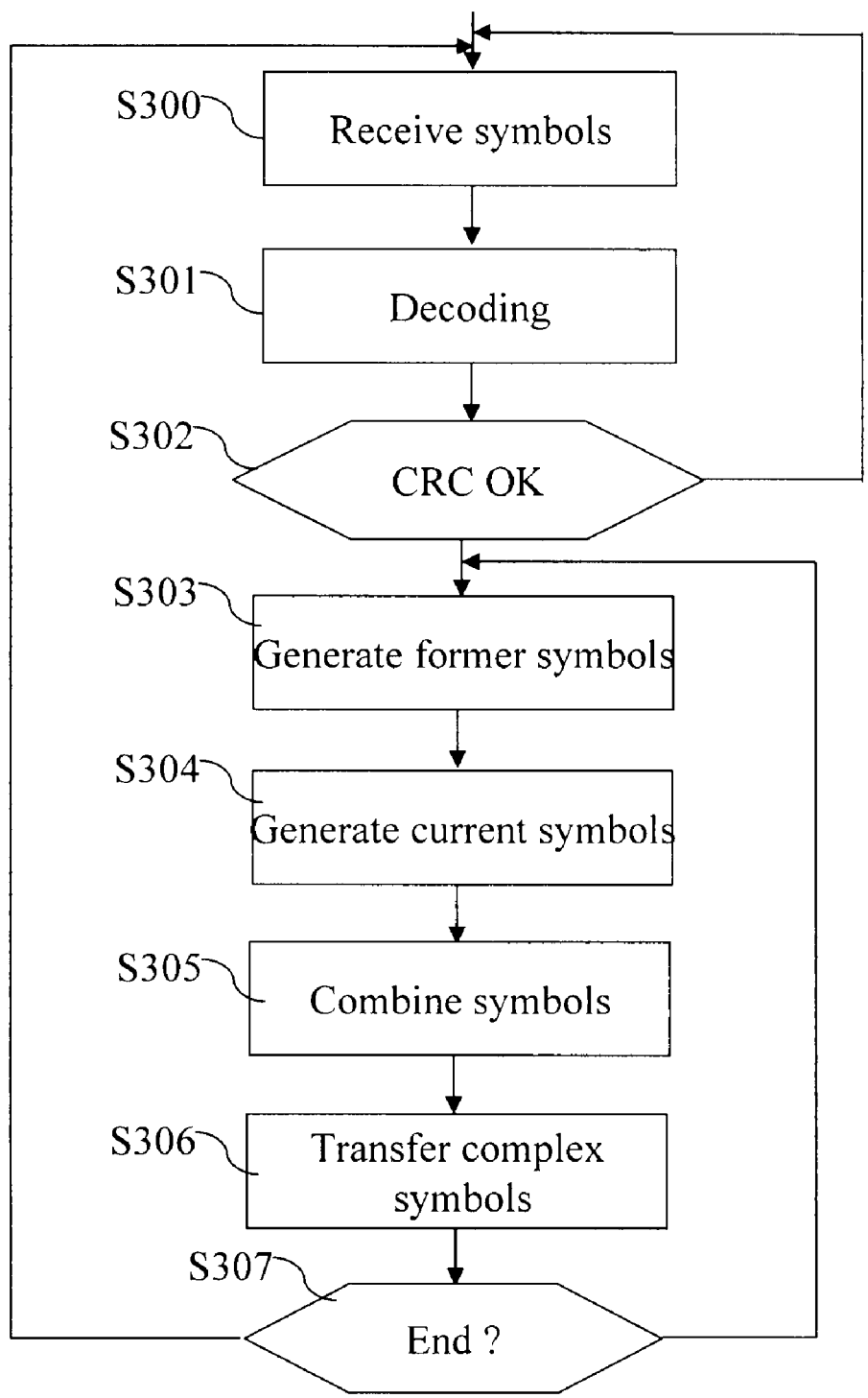
Figure 4:
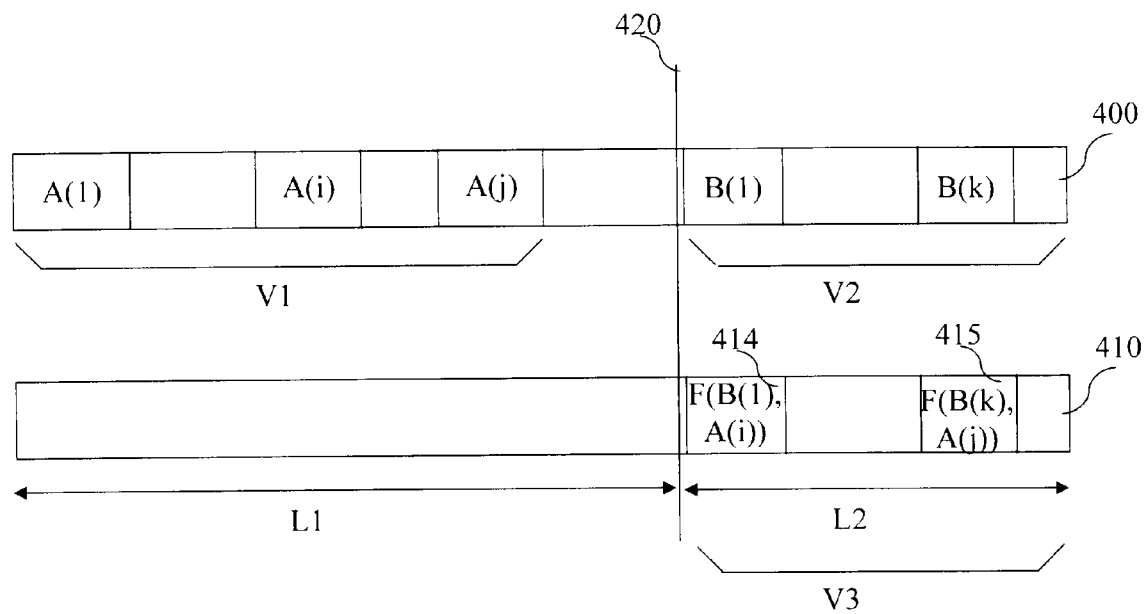
Figure 5:
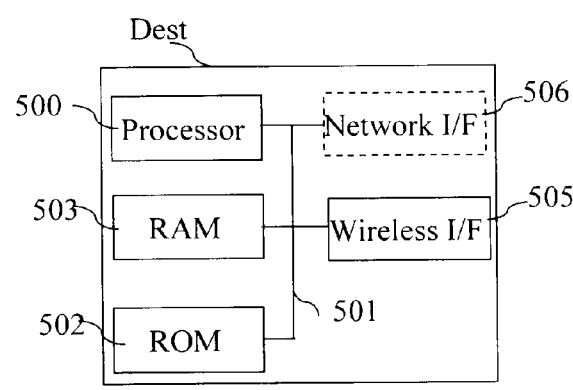
Figure 6:
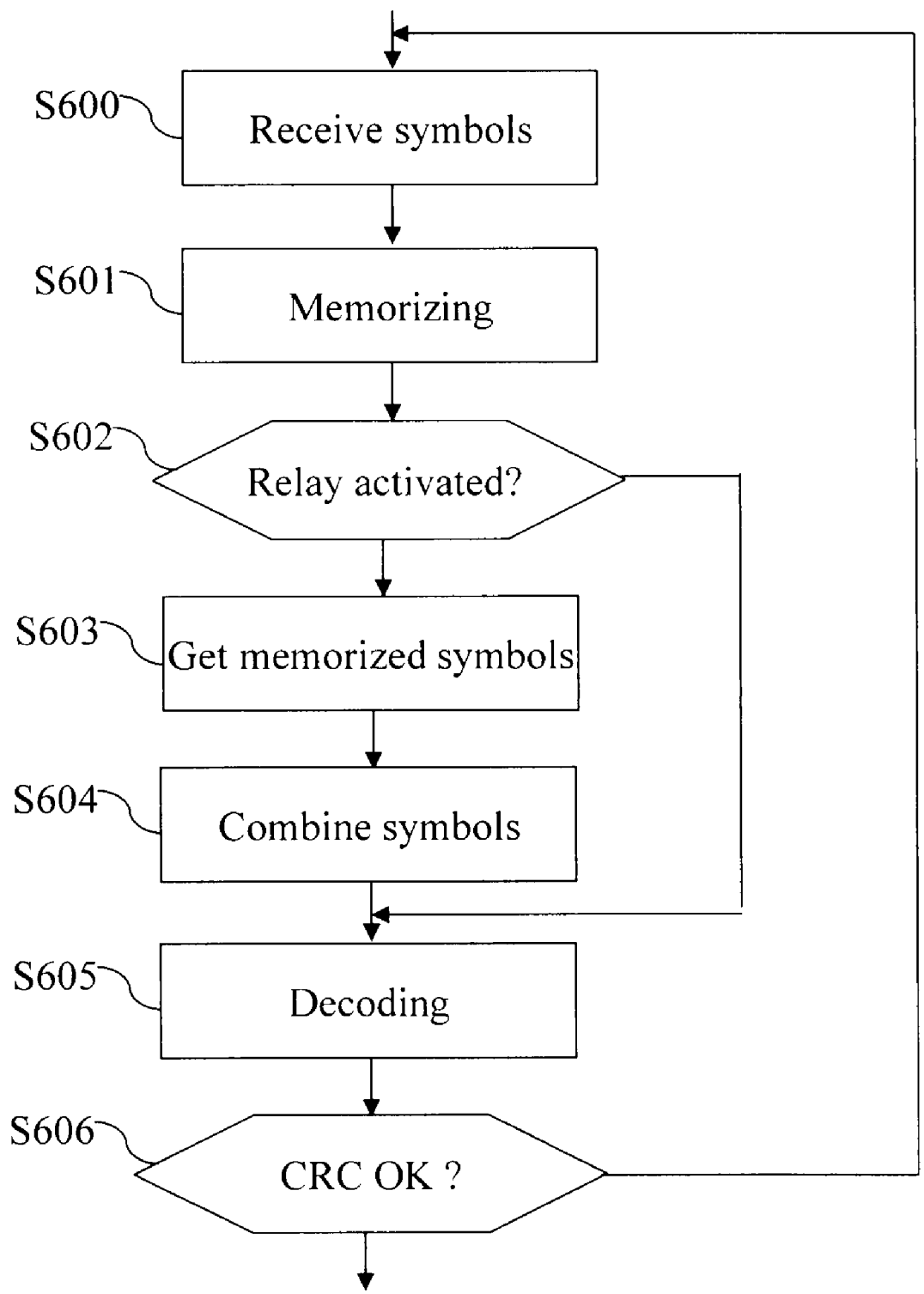
Figure 7:
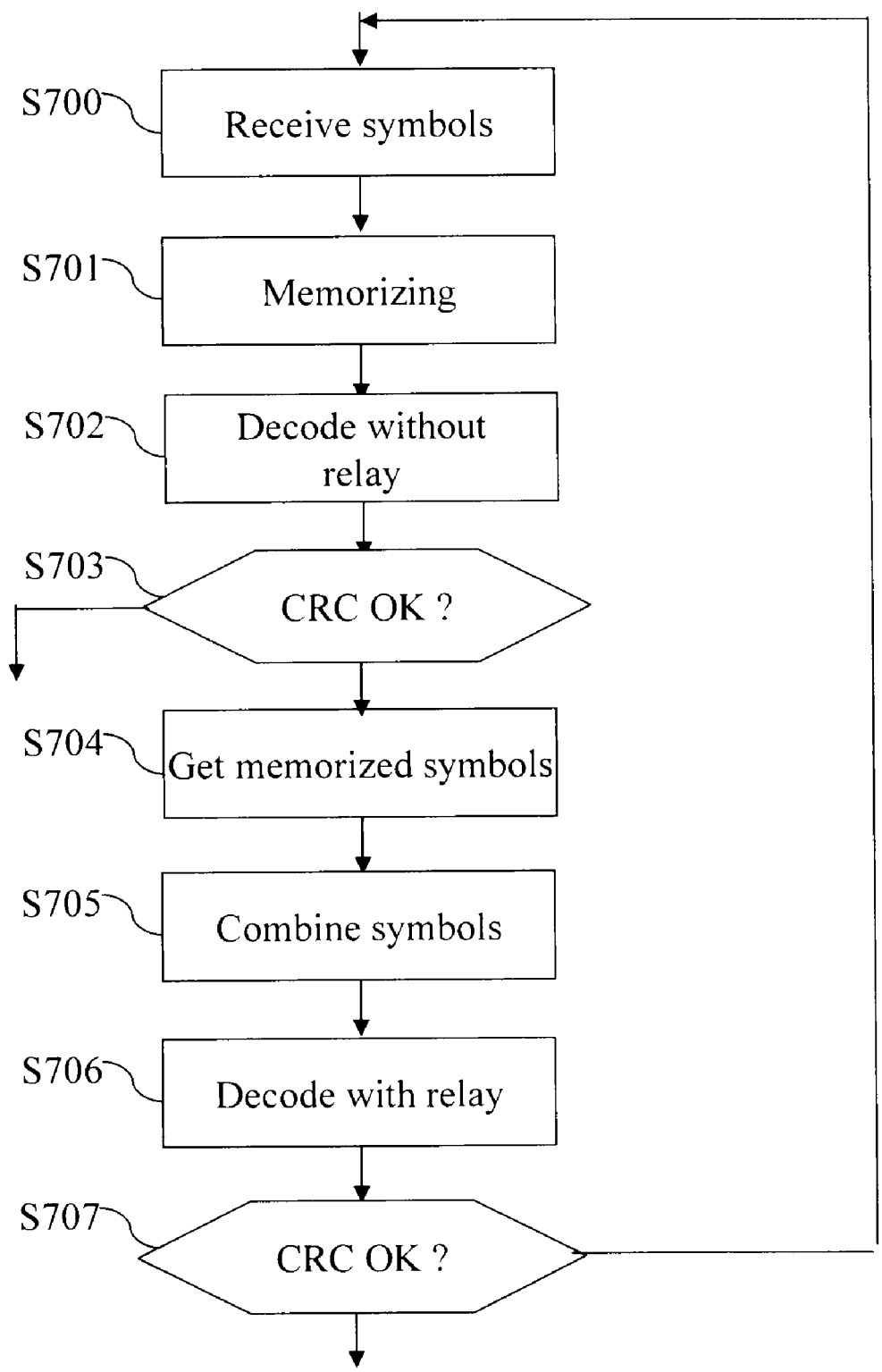

FIG. 3 discloses an example of an algorithm executed by the relay according to the present invention;

FIG. 4 is an example of dynamic decode and forward protocol with diversity improvement according to the present invention;

FIG. 5 is a diagram representing the architecture of a destination in which the present invention is implemented;

FIG. 6 discloses a first example of an algorithm executed by the destination according to the present invention;

FIG. 7 discloses a second example of an algorithm executed by the destination according to the present invention.

Figure 1:
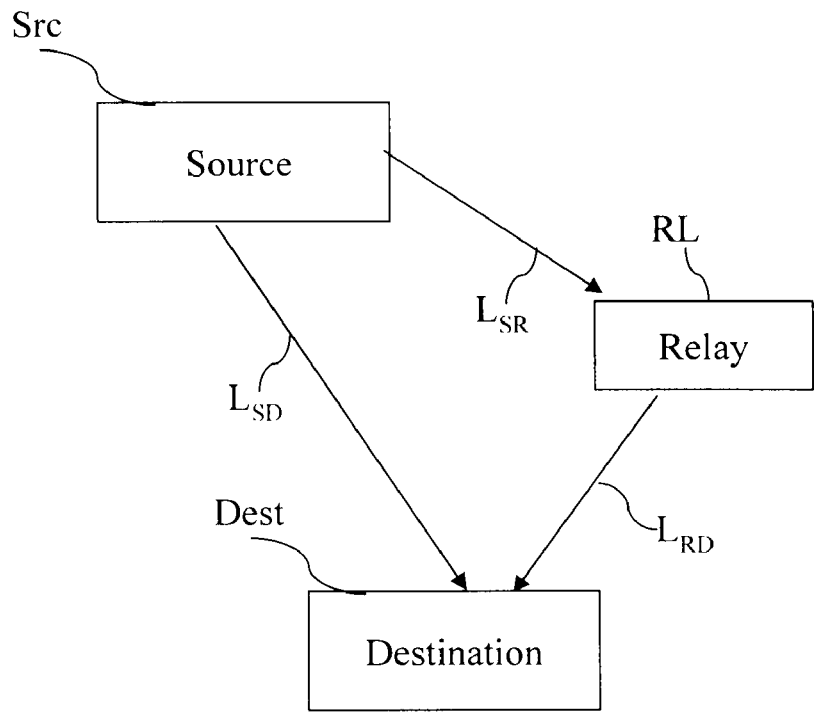
FIG. 1 represents the architecture of a wireless cellular telecommunication network in which the present invention is implemented.

FIG. 1 represents the architecture of a wireless cellular telecommunication network in which the present invention is implemented.

In the wireless cellular telecommunication network, a source Src transfers signals to at least one destination Dest.

The source Src may be a base station which transfers signals to at least one destination like a mobile terminal or to a home base station.

The source Src may be a mobile terminal or a home base station which transfers signals to at least one destination like a base station.

The base station is also named an access node or a node B or an enhanced node B.

The base station or the home base station may handle at least one mobile terminal.

A base station handles a mobile terminal when the base station has the information necessary for enabling the mobile terminal to establish a communication with a remote device through the base station.

The base station transfers signals to the mobile terminal through a downlink channel and receives signals transferred by the mobile terminal through an uplink channel.

The source Src transmits K information bits of an information word with redundancy which are encoded by an encoder, output of which is interleaved to produce a vector of coded bits.

The vector of coded bits is given to the discrete modulation input which may be a Quadrature Phase Shift Keying modulation or a 16, 32 or 64 Quadrature Amplitude Modulation in order to obtain complex modulation symbols. The complex modulation symbols are grouped into vectors of complex modulation symbols which encompass several blocks of complex modulation symbols.

A block of complex modulation symbols comprises, according to the invention, the minimum number of complex symbols which are combined by a relay RL when the relay RL transfers signals according to the present invention.

Each block of complex modulation symbols is sent over several time periods through the channel by means of virtual antennas which are composed of the concatenation of a precoding scheme that applies a transformation of the complex modulation symbols before mapping to the physical transmit antennas.

The minimum number of complex symbols comprised in a block of complex symbols is equal to the number of virtual antennas of the antenna array formed by the relay RL and the source Src.

Encoding and interleaving is done more generally by a rate matching algorithm, such as the one used in the 3GPP-LTE standard (Third Generation Partnership Project-Long Term Evolution), that allows to generate any size of vector of coded bits from the information words, or in other words any possible coding rate. The generation of the coded bits can also be done in several steps, according to the blocks of complex modulation symbols transmission.

In the wireless cellular telecommunication network, a Hybrid-ARQ (HARQ) feedback scheme is provided from the destination Dest to the source Src in order to acknowledge or not the success of former blocks transmissions.

In Hybrid-ARQ, a retransmission of additional redundancy is executed when the destination Dest is not able to successfully decode symbols, i.e. when the Cyclic redundancy check embedded in the sent information word (CRC) fails.

As soon as sufficient redundancy is received, the destination Dest can decode the message correctly and the transmission is stopped.

The destination Dest stores the concatenation of vectors of complex modulation symbols or of soft estimates of the coded bits received from the beginning of one information word transmission and applies a joint decoding on the concatenated vectors.

An acknowledgment is performed after a vector of complex modulation symbols reception and decoding if the CRC check for the vector of complex modulation symbols is correct.

Usually, each new vector of complex modulation symbols comprises additional redundancy taken from the output of the rate matching algorithm and of the error correcting code.

The present invention is also applicable in open-loop transmissions like broadcasting where a codeword is segmented into several vectors of coded bits or equivalently to several vectors of complex modulation symbols.

The arrow noted $L_{SR}$ represents the path between the source Src and the relay RL. The arrow noted $L_{RD}$ represents the path between the relay RL and the destination Dest. The arrow noted $L_{SD}$ represents the path between the source Src and the destination Dest.

According to the invention, the relay RL receives and successfully decodes symbols, generates symbols that have been previously transferred by the source Src and other symbols that have not previously been transferred by the source Src by using the same rate matching algorithm as the source.

The relay RL combines the symbols that have been previously transferred by the source Src and symbols that have not previously been transferred by the source Src into combined symbols and transfers the combined symbols.

The combined symbols are, for example, transferred at the same time as the source Src also transfers other symbols that have not previously been transferred by the source Src. The other symbols that have not previously been transferred by the source Src and generated by the relay RL and the source Src may be the same but are generally not the same.

In a particular mode of realisation of the present invention, the relay RL monitors the acknowledgments and non acknowledgments transferred by the destination Dest to the source Src.

When the relay RL receives and successfully decodes symbols, the relay RL generates symbols that have been previously transferred by the source Src and other symbols that have not previously been transferred by the source Src by using the same rate matching algorithm as the source only when a non acknowledgment is detected. When an acknowledgment is detected, no more symbol is generated by the source Src and the relay RL for the message transmission.

The relay RL and the destination Dest have plural antennas not shown in FIG. 1.

Figure 2:
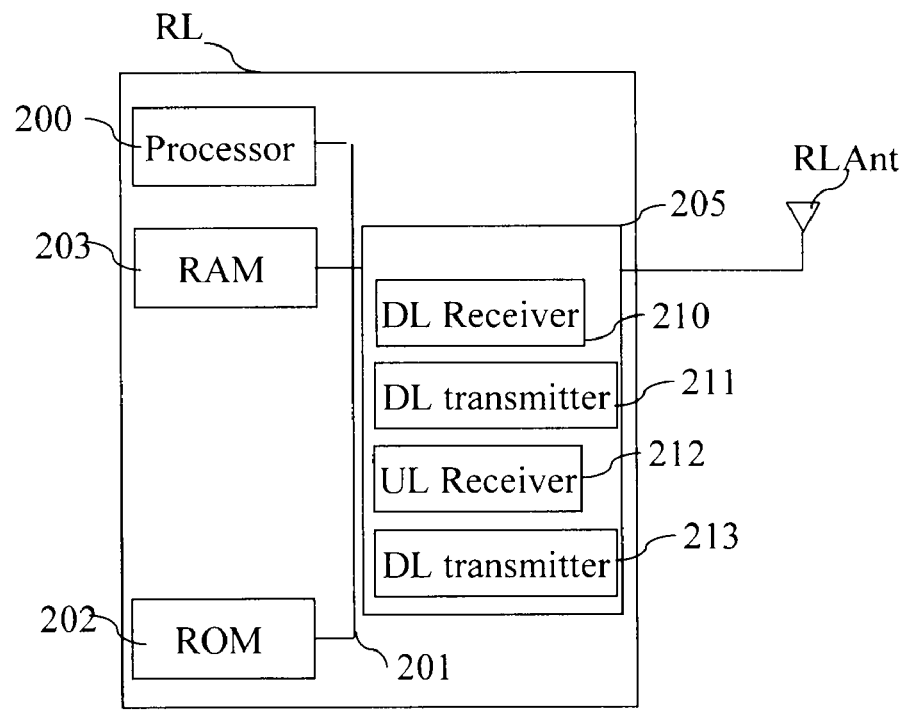
FIG. 2 is a diagram representing the architecture of a relay in which the present invention is implemented.

FIG. 2 is a diagram representing the architecture of a relay in which the present invention is implemented.

The relay RL has, for example, an architecture based on components connected together by a bus 201 and a processor 200 controlled by the program as disclosed in the FIG. 3.

The bus 201 links the processor 200 to a read only memory ROM 202, a random access memory RAM 203 and a wireless interface 205.

The memory 203 contains registers intended to receive variables and the instructions of the program as disclosed in the FIG. 3.

The processor 200 controls the operation of the wireless interface 205.

The read only memory 202 contains instructions of the program as disclosed in the FIG. 3, which are transferred, when the relay RL is powered on, to the random access memory 203.

The wireless interface 205 enables the relay RL to transfer and/or receive signals or messages to/from a base station or a home base station and to/from at least one mobile terminal.

The wireless interface 205 may comprise a downlink reception module 210 which receives signals transferred by at least one base station or by a home base station, may comprise a downlink transmission module 211 which transfers signals to at least one mobile terminal or to a home base station, may comprise an uplink reception module 212 which receives signals transferred by at least one mobile terminal or by a home base station and may comprise an uplink transmission module 213 which transfers signals to at least one base station or to a home base station.

The relay RL operates according to a Dynamic Decode and Forward (DDF) protocol.

DDF protocol includes a smart processing at the relay RL. The relay receives and tries to decode the information transmitted from the source Src to the destination Dest and shifts to a transmission phase as soon as the decoding leads to no error.

FIG. 3 discloses an example of an algorithm executed by the relay according to the present invention.

More precisely, the present algorithm is executed by the processor 200 of the relay RL.

At step S300, the processor 200 detects the reception of a vector of complex modulation symbols through the wireless interface 205.

The vector of complex modulation symbols is received by the downlink receiver 210 or the uplink receiver 212 and is concatenated to the vectors of complex modulation symbols which have been previously received from the beginning of the transmission of one information word.

One vector of complex modulation symbols of the concatenated received vector of complex modulation symbols is for example as the ones disclosed in FIG. 4.

FIG. 4 is an example of a transmission with a dynamic decode and forward protocol with diversity improvement according to the present invention.

The upper portion 400 represents vectors of complex modulation symbols, which are transferred by the source Src to the destination Dest.

Two vectors of complex modulation symbols V1 and V2 are shown in FIG. 4 for the sake of simplicity. In fact, a more important number of vectors of complex modulation symbols may be transferred during a phase L1 by the source Src and/or during a phase L2 by the source Src and the relay RL.

The vector of complex modulation symbols V1 comprises the blocks of complex symbols A(1), A(i) and A(j). The vector of complex modulation symbols V1 is received by the relay RL.

The vector of complex modulation symbols V2 comprises the blocks of complex symbols B(1) and B(k). The vector of complex modulation symbols V2 is not decoded by the relay RL as it will be disclosed hereinafter.

The lower part 410 represents a vector of complex modulation symbols transferred by the relay RL.

The vector of complex modulation symbols V1 is successfully decoded by the relay RL. As far as the vector of complex modulation symbols is not successfully decoded, the relay RL is in the phase noted L1 wherein the relay RL receives vectors of complex modulation symbols V1 and tries to decode them.

When at least one vector of complex modulation symbols is successfully decoded, for example at line 420 of FIG. 4, the relay RL enters in a phase noted L2 wherein the relay RL stops to decode symbols transferred by the source Src and transfers at least one vector of complex modulation symbols.

According to the example of FIG. 4, the relay RL transfers the vector of complex modulation symbols V3.

The vector of complex modulation symbols received at step S300 is for example the vector V1 in FIG. 4.

At next step S301, the processor 200 commands the wireless interface to decode at least one received vector of complex modulation symbols.

The at least one received vector of complex modulation symbols including the vector of complex modulation symbols V1 may include at least one vector of complex modulation symbols previously received by the relay RL and not shown in FIG. 4.

The at least one complex modulation symbols is demodulated, de-interleaved and decoded into soft estimates of information bits and redundancy.

At next step S302, the processor 200 checks if the CRC determined after the decoding of the at least one decoded received vector of complex modulation symbols is correct.

If the CRC is correct, the processor 200 moves to step S303, otherwise, the processor 200 returns to step S300.

It has to be noted here that in a variant, if the CRC is correct, the processor 200 moves to step S303 and further checks if an acknowledgment message has been transferred by the destination Dest to the source Src for the last received vector of complex modulation symbols.

If an acknowledgment message has been transferred, the processor 200 moves to step S303, otherwise, the processor 200 returns to step S300.

Once the CRC is correct, i.e. starting from the line noted 420 in FIG. 4, the processor 200 knows the K information bits transmitted by the source Src and is able to generate blocks and vectors of complex modulation symbols in the same way as the source Src, thanks to a rate matching algorithm.

The phase L1 in FIG. 4 is the time period during which several vectors of complex modulation symbols are sent by the source Src, and during which the relay RL could not get a successful CRC.

In a particular mode of realisation of the present invention, when the relay RL monitors the acknowledgments, non acknowledgments transferred by the destination Dest to the source Src, the phase L1 is also the time period during which several vectors of complex modulation symbols could not get a successful CRC by destination Dest.

According to that particular mode of realisation, the phase L2 in FIG. 4 is the time period during which the destination Dest can not get a successful CRC.

As the processor 200 knows the K information bits transmitted by the source Src, the processor 200 can then determine the corresponding redundancy and produce the interleaved coded bits thanks to the rate matching algorithm.

The vector of coded bits are then given to the discrete modulation input which produces complex modulation symbols.

The processor 200 is able to generate vectors of complex modulation symbols previously transferred by the source Src during phase L1 and to generate vectors of complex modulation symbols that will be transferred by the source Src during phase L2.

Furthermore, the processor 200 is able to generate vectors of complex modulation symbols that are a combination of vectors of complex modulation symbols previously transferred by the source Src and of vectors of complex modulation symbols that will be transferred by the source Src.

At step S303, the processor 200 obtains complex modulation symbols which are comprised in a block of complex modulation symbols previously transferred by the source Src.

For example, the processor 200 obtains complex modulation symbols which are comprised in the block of complex modulation symbols A(i).

The block of complex modulation symbols A(i) is selected according to a predefined rule known by the relay RL and by the destination Dest.

At next step S304, the processor 200 obtains complex modulation symbols which are comprised in a block of complex modulation symbols which will be transferred by the source Src.

As the processor 200 knows the K information bits transmitted by the source Src, the processor 200 can then determine the corresponding redundancy and can determine which complex modulation symbols will be transferred by the source Src.

For example, the processor 200 obtains complex modulation symbols which are comprised in a block of complex modulation symbols B(1) in FIG. 4.

At next step S305, the processor 200 combines the complex modulation symbols which are comprised in the blocks of complex modulation symbols A(i) and B(1) into combined complex modulation symbols.

At next step S306, the processor 200 commands the conversion of the combined complex modulation symbols into a block of complex modulation symbols.

The processor 200 also combines the complex modulation symbols which are comprised in the blocks of complex modulation symbols A(j) and B(k) into combined complex modulation symbols.

The processor 200 commands the transfer of the vector of complex modulation symbols V3.

The vector of complex modulation symbols V3 is transferred at step S305 at the same time as the vector of complex modulation symbols V2 transferred by the source Src.

Once the relay RL successfully decodes the symbols, the destination Dest receives a signal transmitted by at least two virtual antennas, i.e. the source Src and the relay RL as it is the case with classical Multiple Input Multiple Output MIMO channels with two transmit antennas.

The minimal configuration to recover the full diversity with two transmit antennas is to transmit four symbols on two transmit antennas during two time slots. A power control might be applied at the relay in order that the destination Dest will receive signals transferred by the relay RL and the source at the same power.

Let consider A(i)=[$z_1$, $z_2$], B(k)=[$z_3$, $z_3$] and F(B(k), A(i))=[$f_1(z_1,z_2,z_3,z_4)$ $f_2(z_1,z_2,z_3,z_4)$] where $z_1$, $z_2$, $z_3$ and $z_4$ are complex symbols, and $f_1$ and $f_2$ are functions, examples of which will be given.

A(i) is a block of two complex modulation symbols transmitted during two time slots of phase L1, B(k) is a block of two complex modulation symbols transmitted during two time slots of phase L2 and F(B(k),A(i)) is a block of two complex modulation symbols transmitted by the relay RL during two time slots of phase L2.

The signal received by the destination Dest during the first phase L1 is $Y_1$ and defined as $$Y_1 = [h_{SD} \ h_{RD}] \begin{bmatrix} z_1 & z_2 \\ 0 & 0 \end{bmatrix} + N_1$$

where $N_1$ is a matrix of additive white Gaussian noise, $h_{SD}$ is the vector of propagation coefficients of the channel between the source Src and the destination Dest, $h_{RD}$ is the vector of propagation coefficients of the channel between the relay RL and the destination Dest.

The signal received by the destination Dest during the second phase is $Y_2$ and defined as $$Y_2 = [h_{SD} \ h_{RD}] \begin{bmatrix} z_3 & z_4 \\ f_1(z_1, z_2, z_3, z_4) & f_2(z_1, z_2, z_3, z_4) \end{bmatrix} + N_2$$

where $N_2$ is a matrix of additive white Gaussian noise.

By applying a combination between $Y_1$ and $Y_2$, the destination Dest can build a new equivalent channel model. For example, we consider a combination with matrices A and B, such as:

$$Y = Y_1 A + Y_2 B$$

For example, the destination Dest computes a linear combination such that we obtain:

$$Y = \frac{Y_1 + \alpha Y_2}{\sqrt{1 + |\alpha|^2}} =$$

$$\frac{1}{\sqrt{1+|\alpha|^2}} [h_{SD} \ h_{RD}] \begin{bmatrix} z_1 + \alpha z_3 & z_2 + \alpha z_3 \\ \alpha f_1(z_1, z_2, z_3, z_4) & \alpha f_2(z_1, z_2, z_3, z_4) \end{bmatrix} + N$$

where N is a matrix of additive white Gaussian noise.

Thus, by smartly mixing symbols of phase L1 and phase L2, the present invention can build a full diversity scheme and thus change the diversity order of a subset of bits sent in phase L1.

The relay RL is able to know at the same time $z_1$, $z_2$, $z_3$ and $z_4$, i.e., is able to build $z_3$ and $z_4$ as soon as they are transmitted by the source Src.

This is achieved thanks to the DDF protocol combined with coded word segmentation and rate matching which are known by the relay RL and that allows an early decoding of the information word.

A full-diversity orthogonal scheme can be achieved in the present invention by choosing $f_1$ and $f_2$ as follows:

$$\begin{cases} f_1(z_1, z_2, z_3, z_4) = -\frac{1}{\alpha}(z_2 + \alpha z_4)^* \\ f_2(z_1, z_2, z_3, z_4) = \frac{1}{\alpha}(z_1 + \alpha z_3)^* \end{cases}$$

where * denotes the complex conjugate, $\alpha$ is a scaling factor.

With the linear combination, this leads to the following equivalent channel model, equal to a classical Alamouti scheme as disclosed in the paper of S. M. Alamouti entitled *A simple transmit diversity technique for wireless communications*. IEEE J published in Sel. Areas Commun., 16:1451-1458, 1998) with a $z_1 + \alpha z_3$ input modulation.

$$Y = \frac{Y_1 + \alpha Y_2}{\sqrt{1+|\alpha|^2}} = \frac{1}{\sqrt{1+|\alpha|^2}}[h_{SD} \; h_{RD}]\begin{bmatrix} z_1 + \alpha z_3 & z_2 + \alpha z_4 \\ -(z_2 + \alpha z_4)^* & (z_1 + \alpha z_3)^* \end{bmatrix} + N.$$

For example, if $z_1$ and $z_3$ are QPSK symbols, choosing $\alpha = \frac{1}{2}$ virtually builds a 16-QAM modulation, i.e., the 16-QAM is not really sent by the source Src or the relay RL, but the destination Dest perceives the received message as if it were sent with a 16-QAM modulation and an Alamouti scheme.

Thus, the decoder can be implemented with low complexity at the destination Dest and the source Src may transmit the symbols without taking into account the phases L1, L2 status.

Furthermore, as the fading channel model at the input of the decoder is a Matryoshka $M(\{2,1\},\{2N_{L2},N_{L1}-N_{L2}\})$ channel, the full diversity order of two is obtained at the receiver's decoder output as soon as $N_{L2} \geq K/2$.

Indeed, $N_{L2}$ coded bits out of the $N_{L1}$ coded bits of phase L1 are virtually sent through the two channels created with $$\frac{1}{\sqrt{7}}Y_1\begin{bmatrix} 1+j & -(1+2j) \\ -1+2j & -(1-j) \end{bmatrix} + Y_2 = [h_{SD} \; h_{RD}]\begin{bmatrix} (1+j)z_1/\sqrt{7} + (-1+2j)z_2/\sqrt{7} + z_3 & -(1+2j)z_1/\sqrt{7} - (1-j)z_2/\sqrt{7} + z_4 \\ -(1-2j)z_1^*/\sqrt{7} - (1+j)z_2^*/\sqrt{7} - z_4^* & -(1-j)z_1^*/\sqrt{7} + (1+2j)z_2^*/\sqrt{7} + z_3^* \end{bmatrix} + N$$

the proposed scheme of phase L2, as well as new $N_{L2}$ bits sent by the source Src in phase L2.

Matryoshka channels are as disclosed in the paper entitled "Coding for the Non-Orthogonal Amplify-and-Forward Cooperative Channel" of G. M. Kraidy, N. Gresset and J. J. Boutros and published in Information Theory Workshop 2007 (ITW'07), Lake Tahoe, Calif., USA.).

If a Golden code is used in the present invention, $f_1$ and $f_2$ are chosen as follows:

$$\begin{cases} f_1(z_1, z_2, z_3, z_4) = j\frac{\bar{\phi}}{\alpha\phi}(z_2 + \bar{\alpha}z_4) \\ f_2(z_1, z_2, z_3, z_4) = \frac{\bar{\phi}}{\alpha\phi}(z_1 + \bar{\alpha}z_3) \end{cases}$$

where $\phi$ is complex constant and $\bar{x}$ is the algebraic conjugate of x.

Which leads to the following equivalent channel model by applying a linear combination:

$$Y = \frac{\phi(Y_1 + \alpha Y_2)}{\sqrt{1+|\alpha|^2}} = \frac{1}{\sqrt{1+|\alpha|^2}}[h_{SD} \; h_{RD}]\begin{bmatrix} \phi(z_1 + \alpha z)_3 & \phi(z_2 + \alpha z_4) \\ \alpha\phi f_1(z_1, z_2, z_3, z_4) & \alpha\phi f_2(z_1, z_2, z_3, z_4) \end{bmatrix} + N$$

Thus, by choosing $$\alpha = \frac{1+\sqrt{5}}{2}, \bar{\alpha} = \frac{1-\sqrt{5}}{2},$$

$\bar{\phi} = 1+j\alpha$ and $\phi = 1+j-j\alpha$, one can build an equivalent model corresponding to the transmission of a Golden code.

The block fading channel model at the input of the decoder is a Matryoshka $M(\{2,1\},\{2N_{L2},N_{L1}-N_{L2}\})$ channel, and the full diversity is obtained at the receiver as soon as $N_{L2} \geq K/2$.

If a Silver code as disclosed in the paper of A. Hottinen and O. Tirkkonen, entitled "Precoder designs for high rate space-time block codes," published in Proc. Conference on Information Sciences and Systems, Princeton, N.J., Mar. 17-19, 2004.) is used in the present invention, $f_1$ and $f_2$ are chosen as follows:

$$\begin{cases} f_1(z_1, z_2, z_3, z_4) = -\frac{1-2j}{\sqrt{7}}z_1^* - \frac{1+j}{\sqrt{7}}z_2^* - z_4^* \\ f_2(z_1, z_2, z_3, z_4) = -\frac{1-j}{\sqrt{7}}z_1^* + \frac{1+2j}{\sqrt{7}}z_2^* + z_3^* \end{cases}$$

By applying a combination as follows, this leads to a Silver code scheme that allows full diversity and high coding gain, with reduced complexity when compared to a Golden Code.

Furthermore, the block fading channel model at the input of the decoder is a Matryoshka $M(\{2,1\},\{2N_{L2},N_{L1}-N_{L2}\})$ channel, and the full diversity is obtained at the receiver as soon as $N_{L2} \geq K/2$.

At next step S307, the processor 200 checks if the transmission of vectors of complex modulation symbols ends or if an acknowledgement is sent from the destination Dest to the source Src.

The transmission of blocks of complex modulation symbols ends when the destination Dest acknowledges one vector of complex modulation symbols or when no acknowledgment is received within a given time period or in case of broadcasting, when all vectors of complex modulation symbols are transferred.

If the transmission of vectors of complex modulation symbols ends, the processor 200 returns to step S300. Otherwise, the processor 200 moves to step S303 already disclosed.

FIG. 5 is a diagram representing the architecture of a destination in which the present invention is implemented.

The destination Dest has, for example, an architecture based on components connected together by a bus 501 and a processor 500 controlled by the programs as disclosed in FIG. 6 or 7.

The bus 501 links the processor 500 to a read only memory ROM 502, a random access memory RAM 503, a wireless interface 505 and a network interface 506 if the destination is a base station or a home base station.

The memory 503 contains registers intended to receive variables and the instructions of the programs related to the algorithms as disclosed in FIG. 6 or 7.

The processor 500 controls the operation of the network interface 506 if the destination is a base station and controls the operation of the wireless interface 505.

The read only memory 502 contains instructions of the program related to the algorithms as disclosed in FIG. 6 or 7, which are transferred, when the destination Dest is powered on, to the random access memory 503.

If the destination is a base station or a home base station, the destination Dest may be connected to a telecommunication network through the network interface 506. For example, the network interface 506 is a DSL (Digital Subscriber Line) modem, or an ISDN (Integrated Services Digital Network) interface, etc.

Through the network interface 506, the destination Dest may transfer messages to other base stations of the wireless cellular telecommunication network or to core devices of the wireless cellular telecommunication network.

FIG. 6 discloses a first example of an algorithm executed by the destination according to the present invention.

More precisely, the present algorithm is executed by the processor 500 of the destination.

At step S600, the processor 500 detects the reception of a vector of complex modulation symbols through the wireless interface 505.

The received vector of complex modulation symbols is for example the vector V1 and comprises the blocks A(1), A(i) and A(j).

At next step S601, the processor 500 memorizes in the RAM memory 503 the complex modulation symbols comprised in the received vector of complex symbols.

At next step S602 the processor 500 checks if the relay RL transfers signals.

The processor 500 can determine that the relay RL transfers signals by being notified by the wireless interface 505 that the power of received signals increases or by being notified by the wireless interface 505 that new pilot symbols are received or by receiving a message transferred by the relay RL or by the source Src.

If the relay RL transfers signals, the processor 500 moves to step S603. Otherwise, the processor 500 moves to step S605.

According to the example of FIG. 4, the relay RL does not transfer signals during the transmission of the vector of complex symbols V1.

At step S605, the processor 500 commands the wireless interface 505 to decode the at least one received vector of complex modulation symbols.

The at least one complex modulation symbol is demodulated, de-interleaved and decoded into information bits and redundancy.

At next step S606, the processor 500 checks if the CRC determined after the decoding of the at least one received vector of complex modulation symbols is correct.

If the CRC is correct, the processor 500 interrupts the present algorithm. Otherwise, the processor 500 returns to step S600.

The processor 500 may also command the transfer of an acknowledgment or a non acknowledgment message to the source Src.

For example, the CRC for the at least one received vector of complex modulation symbols is not correct, the processor 500 returns to step S600 and detects the reception of at least another vector of complex modulation symbols through the wireless interface 505.

The received vectors of complex modulation symbols are for example the vectors of complex modulation symbols V2 and V3 and comprise respectively the blocks B(1) and B(k) and F(B(1), A(i)) and F(B(k), A(j)).

At next step S601, the processor 500 memorizes, in the RAM memory 503, the complex modulation symbols comprised in the received vectors of complex symbols.

At next step S602 the processor 500 checks if the relay RL transfers signals.

According to the example of FIG. 4, the relay RL transfers signals.

At step S603, the processor 500 obtains complex modulation symbols which are comprised in a vector of complex modulation symbols previously transferred by the source Src and memorized in the RAM memory 503.

For example, the processor 500 obtains complex modulation symbols which are comprised in the block of complex modulation symbols A(i).

At next step S604, the processor 500 combines the complex modulation symbols which have just been received and the complex modulation symbols which are comprised in the block of complex modulation symbols A(i).

According to a first example, $f_1$ and $f_2$ are chosen as follows:

$$\begin{cases} f_1(z_1, z_2, z_3, z_4) = -\dfrac{1}{\alpha}(z_2 + \alpha z_4)^* \\ f_2(z_1, z_2, z_3, z_4) = \dfrac{1}{\alpha}(z_1 + \alpha z_3)^* \end{cases}$$

and the signal is Y and defined as:

$$Y = \frac{Y_1 + \alpha Y_2}{\sqrt{1 + |\alpha|^2}} =$$

$$\frac{1}{\sqrt{1 + |\alpha|^2}} [\, h_{SD} \quad h_{RD}\,] \begin{bmatrix} z_1 + \alpha z_3 & z_2 + \alpha z_4 \\ \alpha f_1(z_1, z_2, z_3, z_4) & \alpha f_2(z_1, z_2, z_3, z_4) \end{bmatrix} + N$$

If a Golden code is used in the present invention, $f_1$ and $f_2$ are chosen as follows:

$$\begin{cases} f_1(z_1, z_2, z_3, z_4) = j\dfrac{\overline{\phi}}{\alpha \phi}(z_2 + \overline{\alpha} z_4) \\ f_2(z_1, z_2, z_3, z_4) = \dfrac{\overline{\phi}}{\alpha \phi}(z_1 + \overline{\alpha} z_3) \end{cases}$$

and the signal is Y and defined as:

$$Y = \frac{\phi(Y_1 + \alpha Y_2)}{\sqrt{1 + |\alpha|^2}} =$$

$$\frac{1}{\sqrt{1 + |\alpha|^2}} [\, h_{SD} \quad h_{RD}\,] \begin{bmatrix} \phi(z_1 + \alpha z)_3 & \phi(z_2 + \alpha z_4) \\ \alpha \phi f_1(z_1, z_2, z_3, z_4) & \alpha \phi f_2(z_1, z_2, z_3, z_4) \end{bmatrix} + N.$$

If a Silver code is used in the present invention, $f_1$ and $f_2$ are chosen as follows:

$$\begin{cases} f_1(z_1, z_2, z_3, z_4) = -\dfrac{1-2j}{\sqrt{7}} z_1^* - \dfrac{1+j}{\sqrt{7}} z_2^* - z_4^* \\ f_2(z_1, z_2, z_3, z_4) = -\dfrac{1-j}{\sqrt{7}} z_1^* + \dfrac{1+2j}{\sqrt{7}} z_2^* + z_3^* \end{cases}$$

and the combination of Y1 and Y2 is made as follows:

$$\frac{1}{\sqrt{7}}Y_1\begin{bmatrix} 1+j & -(1+2j) \\ -1+2j & -(1-j) \end{bmatrix} + Y_2 = [h_{SD} \ h_{RD}]\begin{bmatrix} (1+j)z_1/\sqrt{7} + (-1+2j)z_2/\sqrt{7} + z_3 & -(1+2j)z_1/\sqrt{7} - (1-j)z_2/\sqrt{7} + z_4 \\ -(1-2j)z_1^*/\sqrt{7} - (1+j)z_2^*/\sqrt{7} - z_4^* & -(1-j)z_1^*/\sqrt{7} + (1+2j)z_2^*/\sqrt{7} + z_3^* \end{bmatrix} + N.$$

which leads to a Silver code scheme that allows full diversity and high coding with reduced complexity when compared to a Golden Code.

At next step S605, the processor 500 commands the wireless interface 505 to decode the combined complex modulation symbols.

The combined complex modulation symbols are demodulated, de-interleaved and decoded into information bits and redundancy.

After that, the processor 500 moves to step S606 already described.

FIG. 7 discloses a second example of an algorithm executed by the destination according to the present invention.

More precisely, the present algorithm is executed by the processor 500 of the destination Dest.

At step S700, the processor 500 detects the reception of a vector of complex modulation symbols through the wireless interface 505.

The received vector of complex modulation symbols is for example the vector V1 and comprises the blocks A(1), A(i) and A(j).

At next step S701, the processor 500 memorizes in the RAM memory 503 the complex modulation symbols comprised in the received vector of complex symbols.

At next step S702, the processor 500 commands the wireless interface 505 to decode the received vectors of complex modulation symbols by considering that the relay RL does not relay signals.

The signal received is considered as being:

$$Y_1 = [h_{SD} \ h_{RD}]\begin{bmatrix} z_1 & z_2 \\ 0 & 0 \end{bmatrix} + N_1$$

The complex modulation symbols are demodulated, de-interleaved and decoded into information bits and redundancy.

At next step S703, the processor 500 checks if the CRC determined after the decoding of the received vectors of complex modulation symbols is correct.

If the CRC is correct, the processor 500 interrupts the present algorithm. Otherwise, the processor 500 moves to step S704.

At step S704, the processor 500 obtains complex modulation symbols which are comprised in a vector of complex modulation symbols previously transferred by the source Src and memorized in the RAM memory 503.

At next step S705, the processor 500 combines the complex modulation symbols which have just been received and the complex modulation symbols which are comprised in a block of complex modulation symbols.

At next step S706, the processor 500 commands the wireless interface 505 to decode the combined complex modulation symbols considering that the relay RL relays signals.

According to a first example, $f_1$ and $f_2$ are chosen as follows:

$$\begin{cases} f_1(z_1, z_2, z_3, z_4) = -\frac{1}{\alpha}(z_2 + \alpha z_4)^* \\ f_2(z_1, z_2, z_3, z_4) = \frac{1}{\alpha}(z_1 + \alpha z_3)^* \end{cases}$$

And the signal resulting from a linear combination is Y and defined as $$Y = \frac{Y_1 + \alpha Y_2}{\sqrt{1+|\alpha|^2}} =$$

$$\frac{1}{\sqrt{1+|\alpha|^2}}[h_{SD} \ h_{RD}]\begin{bmatrix} z_1 + \alpha z_3 & z_2 + \alpha z_4 \\ \alpha f_1(z_1,z_2,z_3,z_4) & \alpha f_2(z_1,z_2,z_3,z_4) \end{bmatrix} + N$$

If a Golden code is used in the present invention, $f_1$ and $f_2$ are chosen as follows:

$$\begin{cases} f_1(z_1, z_2, z_3, z_4) = j\frac{\overline{\phi}}{\alpha\phi}(z_2 + \overline{\alpha}z_4) \\ f_2(z_1, z_2, z_3, z_4) = \frac{\overline{\phi}}{\alpha\phi}(z_1 + \overline{\alpha}z_3) \end{cases}$$

and the signal is Y and defined as $$Y = \frac{\phi(Y_1 + \alpha Y_2)}{\sqrt{1+|\alpha|^2}} =$$

$$\frac{1}{\sqrt{1+|\alpha|^2}}[h_{SD} \ h_{RD}]\begin{bmatrix} \phi(z_1 + \alpha z_3) & \phi(z_2 + \alpha z_4) \\ \alpha\phi f_1(z_1,z_2,z_3,z_4) & \alpha\phi f_2(z_1,z_2,z_3,z_4) \end{bmatrix} + N.$$

If a Silver code is used in the present invention, $f_1$ and $f_2$ are chosen as follows:

$$\begin{cases} f_1(z_1, z_2, z_3, z_4) = -\frac{1-2j}{\sqrt{7}}z_1^* - \frac{1+j}{\sqrt{7}}z_2^* - z_4^* \\ f_2(z_1, z_2, z_3, z_4) = -\frac{1-j}{\sqrt{7}}z_1^* - \frac{1+2j}{\sqrt{7}}z_2^* + z_3^* \end{cases}$$

and the combination of Y1 and Y2 is made as follows $$\frac{1}{\sqrt{7}}Y_1\begin{bmatrix} 1+j & -(1+2j) \\ -1+2j & -(1-j) \end{bmatrix} + Y_2 = [h_{SD} \ h_{RD}]$$

$$\begin{bmatrix} (1+j)z_1/\sqrt{7} + (-1+2j)z_2/\sqrt{7} + z_3 & -(1+2j)z_1/\sqrt{7} - (1-j)z_2/\sqrt{7} + z_4 \\ -(1-2j)z_1^*/\sqrt{7} - (1+j)z_2^*/\sqrt{7} - z_4^* & -(1-j)z_1^*/\sqrt{7} + (1+2j)z_2^*/\sqrt{7} + z_3^* \end{bmatrix} + N.$$

which leads to a Silver code scheme that allows full diversity and high coding with reduced complexity when compared to a Golden Code.

The combined complex modulation symbols are demodulated, de-interleaved and decoded into information bits and redundancy.

At next step S707, the processor 500 checks if the CRC determined after the decoding of the received block of complex modulation symbols is correct.

If the CRC is correct, the processor 500 interrupts the present algorithm. Otherwise, the processor 500 returns to step S700.

Naturally, many modifications can be made to the embodiments of the invention described above without departing from the scope of the present invention.

The invention claimed is:

1. Method for relaying symbols transferred by a source to a destination in a wireless cellular telecommunication network, the symbols being relayed by a relay, the relay receiving symbols, wherein the method comprises the steps executed by the relay of:
   receiving symbols;
   successfully decoding the symbols;
   generating symbols that have been previously transferred by the source;
   generating symbols that have not previously been transferred by the source;
   combining the generated symbols into combined symbols; and
   transferring the combined symbols to the destination.

2. Method according to claim 1, wherein the combined symbols are transferred at the same time the source transfers symbols that have not previously been transferred by the source.

3. Method according to claim 1, wherein the method comprises further step of detecting acknowledgment or non acknowledgment message transferred by the destination to the source and in that the steps of generating symbols, combining symbols and transferring the combined symbols are executed if acknowledgment message is not detected.

4. Method according to claim 1, wherein the signals transferred by the relay during two time periods are defined as:
$[f_1(z_1, z_2, z_3, z_4)\ f_2(z_1, z_2, z_3, z_4)]$
where $z_1$ and $z_2$ are the generated symbols that have been previously transferred by the source, $z_3$ and $z_4$ are the generated symbols that have not previously been transferred by the source, $f_1$ and $f_2$ are functions used for combining the generated symbols.

5. Method according to claim 4, wherein $f_1$ and $f_2$ are chosen as:

$$\begin{cases} f_1(z_1, z_2, z_3, z_4) = -\frac{1}{\alpha}(z_2 + \alpha z_4)^* \\ f_2(z_1, z_2, z_3, z_4) = \frac{1}{\alpha}(z_1 + \alpha z_3)^* \end{cases}$$

where * denotes the complex conjugate, $\alpha$ is a scaling factor equal to $\alpha = \frac{1}{2}$.

6. Method according to claim 4, wherein $f_1$, and $f_2$ are chosen as:

$$\begin{cases} f_1(z_1, z_2, z_3, z_4) = j\frac{\overline{\phi}}{\alpha\phi}(z_2 + \overline{\alpha}z_4) \\ f_2(z_1, z_2, z_3, z_4) = \frac{\overline{\phi}}{\alpha\phi}(z_1 + \overline{\alpha}z_3) \end{cases}$$

where $\phi$ is complex constant and $\overline{x}$ is the algebraic conjugate of x, $$\alpha = \frac{1+\sqrt{5}}{2}, \overline{\alpha} = \frac{1-\sqrt{5}}{2},$$

$\overline{\phi} = 1+j\alpha$ and $\phi = 1+j-j\alpha$.

7. Method according to claim 4, wherein $f_1$, and $f_2$ are chosen as:

$$\begin{cases} f_1(z_1, z_2, z_3, z_4) = -\frac{1-2j}{\sqrt{7}}z_1^* - \frac{1+j}{\sqrt{7}}z_2^* - z_4^* \\ f_2(z_1, z_2, z_3, z_4) = -\frac{1-j}{\sqrt{7}}z_1^* - \frac{1+2j}{\sqrt{7}}z_2^* + z_3^* \end{cases}$$

where * denotes the complex conjugate.

8. Device for relaying symbols transferred by a source to a destination in a wireless cellular telecommunication network, the symbols being relayed by a relay, the relay receiving symbols, wherein the device is included in the relay and comprises:
   means for receiving symbols;
   means for decoding the symbols;
   means for generating symbols that have been previously transferred by the source;
   means for generating symbols that have not previously been transferred by the source;
   means for combining the generated symbols into combined symbols; and
   means for transferring the combined symbols to the destination.

9. Method for decoding symbols received by a destination in a wireless cellular telecommunication network, the symbols being relayed by a relay, wherein the method comprises the steps executed by the destination of:
   receiving signals representative of symbols;
   reading symbols previously received by the destination and memorised by the destination;
   combining the received symbols and the read symbols; and
   decoding the combined symbols considering that the relay transferred symbols formed by a combination of symbols that have been previously transferred by a source and symbols that have not previously been transferred by a source.

10. Method according to claim 9, wherein the signals representative of symbols are defined as:

$$Y_2 = [h_{SD}\ h_{RD}] \begin{bmatrix} z_3 & z_4 \\ f_1(z_1, z_2, z_3, z_4) & f_2(z_1, z_2, z_3, z_4) \end{bmatrix} + N_2$$

where $N_2$ is a Nrx2 matrix of additive white Gaussian noise, $h_{SD}$ is the vector of Nr propagation coefficients of the channel between the source and the destination, Nr is the number of antennas of the destination, $h_{RD}$ is the vector of Nr propagation coefficients of the channel between the relay and the destination, $z_1$ and $z_2$ are the symbols previously received by the destination and memorised by the destination, $z_1$ and $z_2$, $z_3$ and $z_4$ are the symbols of which the received signals are representative, $f_1$ and $f_2$ are functions used for combining the received symbols and the read symbols and the received symbols are combined according to the following formula:

$Y = Y_1 A + Y_2 B$ where A and B are given matrices, Y1 is representative of symbols previously received by the destination and memorised by the destination $$Y_1 = [\, h_{SD} \quad h_{RD}\,] \begin{bmatrix} z_1 & z_2 \\ 0 & 0 \end{bmatrix} + N_1$$

where $N_1$ is a Nrx2 matrix of additive white Gaussian noise.

11. Method according to claim 10, wherein $f_1$ and $f_2$ are chosen as:

$$\begin{cases} f_1(z_1, z_2, z_3, z_4) = -\frac{1}{\alpha}(z_2 + \alpha z_4)^* \\ f_2(z_1, z_2, z_3, z_4) = \frac{1}{\alpha}(z_1 + \alpha z_3)^* \end{cases}$$

where * denotes the complex conjugate, $\alpha$ is a scaling factor equal to $\alpha = \frac{1}{2}$ and the read symbols and the received symbols are combined according to the following formula:

$$Y = \frac{Y_1 + \alpha Y_2}{\sqrt{1 + |\alpha|^2}}$$

$$= \frac{1}{\sqrt{1 + |\alpha|^2}} [\, h_{SD} \quad h_{RD}\,]$$

$$\begin{bmatrix} z_1 + \alpha z_3 & z_2 + \alpha z_4 \\ \alpha f_1(z_1, z_2, z_3, z_4) & \alpha f_2(z_1, z_2, z_3, z_4) \end{bmatrix} + N.$$

12. Method according to claim 10, wherein $f_1$ and $f_2$ are chosen as:

$$\begin{cases} f_1(z_1, z_2, z_3, z_4) = j\frac{\overline{\phi}}{\alpha \phi}(z_2 + \overline{\alpha} z_4) \\ f_2(z_1, z_2, z_3, z_4) = \frac{\overline{\phi}}{\alpha \phi}(z_1 + \overline{\alpha} z_3) \end{cases}$$

where $\phi$ is complex constant and $\overline{x}$ is the algebraic conjugate of x, $$\alpha = \frac{1 + \sqrt{5}}{2}, \overline{\alpha} = \frac{1 - \sqrt{5}}{2},$$

$\overline{\phi} = 1 + j\alpha$ and $\phi = 1 + j - j\alpha$, and the read symbols and the received symbols are combined according to the following formula:

$$Y = \frac{\phi(Y_1 + \alpha Y_2)}{\sqrt{1 + |\alpha|^2}} =$$

$$\frac{1}{\sqrt{1 + |\alpha|^2}} [\, h_{SD} \quad h_{RD}\,] \begin{bmatrix} \phi(z_1 + \alpha z)_3 & \phi(z_2 + \alpha z_4) \\ \alpha \phi f_1(z_1, z_2, z_3, z_4) & \alpha \phi f_2(z_1, z_2, z_3, z_4) \end{bmatrix} + N.$$

13. Method according to claim 10, wherein $f_1$ and $f_2$ are chosen as:

$$\begin{cases} f_1(z_1, z_2, z_3, z_4) = -\frac{1 - 2j}{\sqrt{7}} z_1^* - \frac{1 + j}{\sqrt{7}} z_2^* - z_4^* \\ f_2(z_1, z_2, z_3, z_4) = -\frac{1 - j}{\sqrt{7}} z_1^* + \frac{1 + 2j}{\sqrt{7}} z_2^* + z_3^* \end{cases}$$

where * denotes the complex conjugate and the read symbols and the received symbols are combined according to the following formula:

$$\frac{1}{\sqrt{7}} Y_1 \begin{bmatrix} 1 + j & -(1 + 2j) \\ -1 + 2j & -(1 - j) \end{bmatrix} + Y_2 = [\, h_{SD} \quad h_{RD}\,]$$

$$\begin{bmatrix} (1+j)z_1/\sqrt{7} + (-1+2j)z_2/\sqrt{7} + z_3 & -(1+2j)z_1/\sqrt{7} - (1-j)z_2/\sqrt{7} + z_4 \\ -(1-2j)z_1^*/\sqrt{7} - (1+j)z_2^*/\sqrt{7} - z_4^* & -(1-j)z_1^*/\sqrt{7} + (1+2j)z_2^*/\sqrt{7} + z_3^* \end{bmatrix} + N.$$

14. Device for decoding symbols received by a destination in a wireless cellular telecommunication network, the symbols being relayed by a relay, wherein the device is included in the destination and comprises:
  means for receiving signals representative of symbols;
  means for reading symbols previously received by the destination and memorised by the destination;
  means for combining the received symbols and the read symbols; and
  means for decoding the combined symbols considering that the relay transferred symbols formed by a combination of symbols that have been previously transferred by a source and symbols that have not previously been transferred by the source.

* * * * *